Feb. 27, 1945. F. C. LORNITZO 2,370,612
FABRICATED PRESSING HEAD
Filed Feb. 23, 1942 6 Sheets-Sheet 1
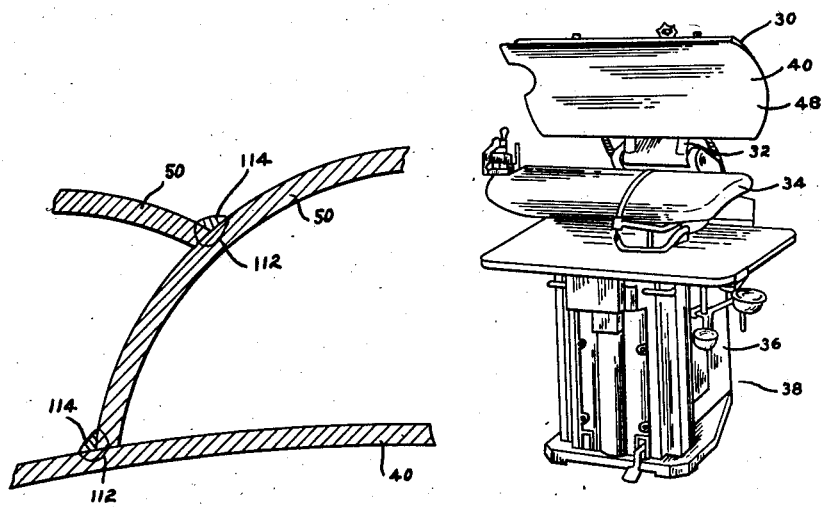
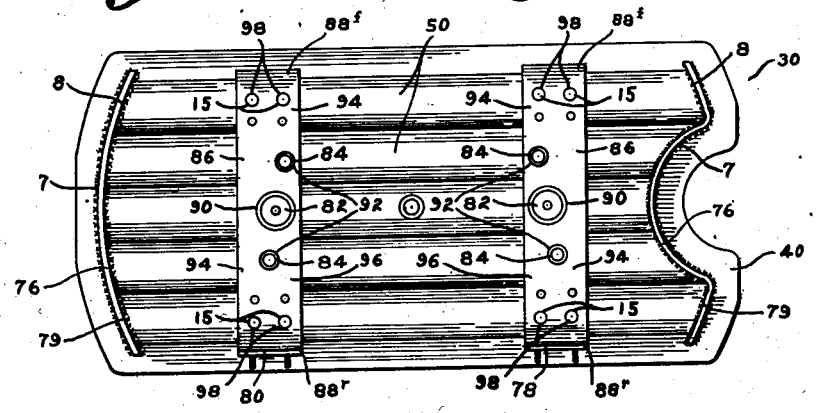
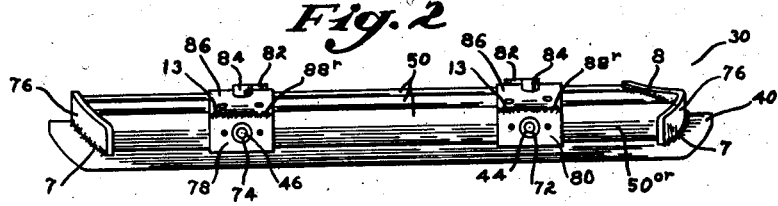
Inventor
Frank C. Lornitzo
By Thomas A. Jenckes
Attorney

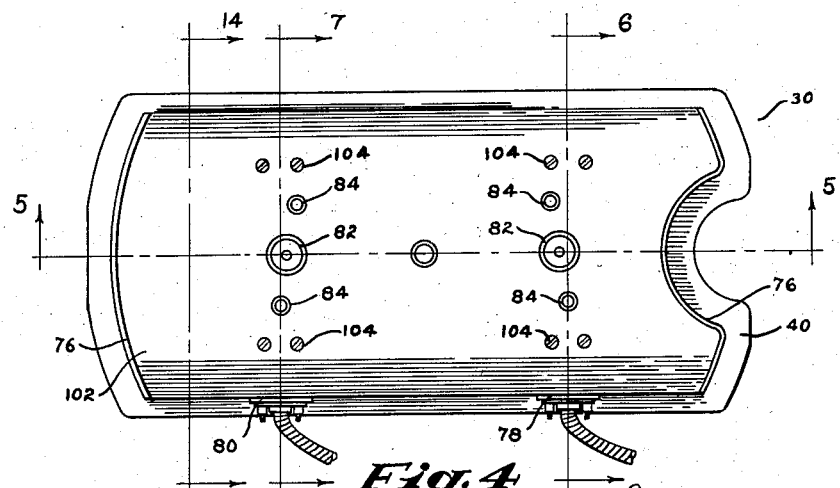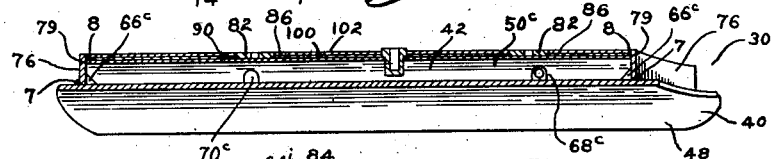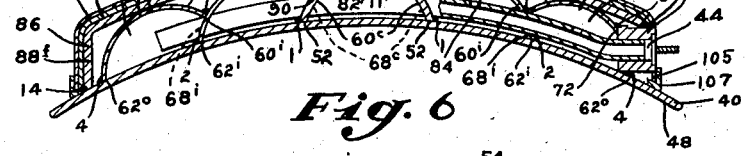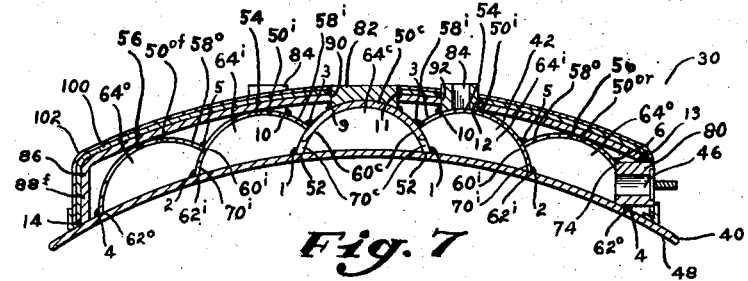

Feb. 27, 1945.   F. C. LORNITZO   2,370,612
FABRICATED PRESSING HEAD
Filed Feb. 23, 1942   6 Sheets-Sheet 3

Inventor
Frank C. Lornitzo
By Thomas A. Jenkins
Attorney

Inventor
Frank C. Lornitzo
By Thomas A. Fincke
Attorney

Patented Feb. 27, 1945

2,370,612

UNITED STATES PATENT OFFICE 2,370,612

FABRICATED PRESSING HEAD

Frank C. Lornitzo, Pawtucket, R. I., assignor to Pantex Pressing Machine, Inc., Central Falls, R. I., a corporation of Delaware Application February 23, 1942, Serial No. 432,021

22 Claims. (Cl. 38—66)

My invention relates to improvements in pressing heads. While my invention is particularly adapted for pressing heads for the usual flat run of laundry work, in its broader principles it is applicable to a wide range of types of pressing heads.

My invention comprises a fabricated pressing head made up of a plurality of individually prefabricated parts suitably joined together in accordance with my invention. In order to attain sufficient strength in the pressing heads, it has been customary in the prior art to make single piece pressing heads of cast metal, which has resulted in extremely heavy pressing heads having thick pressing plates, and their manufacture has been subject to the usual difficulties of casting integral hollow unitary members, such as removing the molding sand therefrom, etc. An object of my invention is to provide a pressing head, which due to its inherent construction and method of assembly may be constructed of a plurality of relatively light parts assembled into the pressing head unit.

A further object of my invention, due to the method of assembly and the method of welding the parts together I preferably employ, preferably with linear fillet welds which fuse the adjacent abutting surfaces together, and also provide of themselves external reinforcements for the steam chamber in the pressing head to suplementally hold the parts together, is to permit the use of lighter elements in the assembly, thus resulting in a finished pressing head comparable in weight to a cast aluminum alloy pressing head, and the use of light non-corrosive parts therefor constructed of stainless steel, Monel metal, or other non-corrosive materials, or suitably plated with a non-corrosive metal plate of nickel, chromium, etc., or "Parkerized" or suitably otherwise finished with a non-corrosive protective covering to make up the assembly.

While I am aware that others have made pressing heads made up of a plurality of parts secured together in various manners, such as by riveting, hard soldering, or having parts surface or spot welded to each other, it is obvious that if a steam chamber be formed of compartments separated by partitions of substantial width across the face of the pressing plate, there will not be a uniform continuity of heat transmitted by the pressing surface of the pressing plate, and a further object of my invention is to provide a pressing head having a steam chamber, preferably a multicompartment steam chamber, employing component parts which may be secured to the pressing plate and still maintain a uniform amount of heat conductivity across the pressing plate.

In addition, employing the surface welding shown in various prior art patents it has been extremely difficult to get at the parts to suitably weld the desired parts together throughout their areas, resulting in unsatisfactory welding of the parts.

A further object of my invention, due to the fact that the pressing plate is individually initially manufactured, is to provide a pressing plate of flawless and, if desired, of non-corrosive construction. In making cast pressing heads, the pressing surface of the pressing plate was often cast with air bubbles despite whatever care may have been taken in the casting, thus creating an imperfect pressing surface. Inasmuch as my improved pressing plate is initially made separately, it is apparent that it may be of less metal, and suitably finished by electroplating or otherwise to provide a smooth flawless pressing surface.

Inasmuch as the pressing plate of my invention is thinner than the cast pressing plates hitherto made in the integral cast pressing heads, it is obvious that the rate of heat transfer through the pressing plate is correspondingly greater.

A further feature of my invention relates to the fact that I select and construct the parts of my invention so that they may be readily assembled by welding to provide the desired fusing of the abutting surfaces and the external reinforcing fillets, in the manner hitherto described, the members being preferably selectively assembled successively on a foundation member, and each individual member being welded to the foundation member prior to the addition of the other members.

A further feature of my invention relates to the simplicity of structure of the individual parts thereof, in the embodiments thereof specifically shown in this application comprising, in addition to the pressing plate means, one or more strong partially cylindrical members of substantially the length of the pressing plate welded thereto by external fillets in the manner hitherto described to make up the steam chamber. With this construction it is apparent that a strong steam chamber is provided, employing members making up one and/or a plurality of arches with the well known inherent strength of arch construction to make up a strong steam chamber of relatively light parts, reinforced in the manner hitherto described by the externally welded fillets.

A further feature of my invention relates to the construction of the means I preferably employ for attaching the pressing head to the pressing lever.

A further feature of an embodiment of my invention is that said partially cylindrical members may be made of such size and individually distributed over and individually welded to the pressing plate as to provide a pressing chamber made up of a plurality of parallel compartments, with all portions of the pressing plate subjected to a substantially maximum stress for each compartment.

A further object of my invention is to provide a novel construction which can be readily embodied in all standard types of pressing heads now on the market, such as laundry pressing heads, pant pressing heads, sleeve pressing heads, collar and cuff pressing heads, etc.

A further object of my invention is to provide a pressing head meeting the requirements of insurance and municipal regulations.

These and such other objects of my invention as may hereinafter appear will be best understood from a description of the accompanying drawings which illustrate various embodiments of my invention.

In the drawings,

Fig. 1 is a diagrammatic perspective view of an embodiment of a pressing head suitable for laundry use, constructed in accordance with my invention, mounted in position on a laundry press.

Fig. 2 is a plan view of my improved pressing head shown in Fig. 1 with the insulating covering and outer shell removed.

Fig. 3 is a side edge elevation illustrating the parts of the pressing head shown in Fig. 2.

Fig. 4 is a plan view of the pressing head shown in Figs. 1–3 with the insulating covering and outer shell attached.

Fig. 5 is a longitudinal sectional view taken along the line 5—5 of Fig. 4.

Fig. 6 is a transverse sectional view taken along the line 6—6 of Fig. 4.

Fig. 7 is a transverse sectional view taken along the line 7—7 of Fig. 4.

Fig. 21 is an enlarged diagrammatic transverse sectional view taken through a portion only of the pressing head to more accurately represent the external fillet welds.

Figure 16:
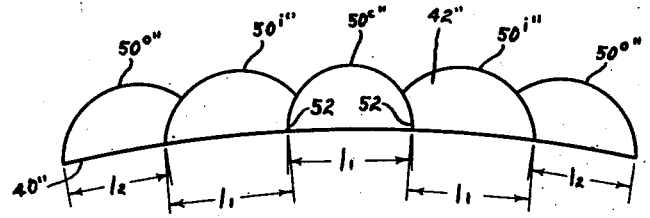
Fig. 16 is a diagrammatic transverse sectional view similar to Fig. 14, illustrating how this feature of equal maximum stress is achieved for a five compartment steam chamber.
Figure 17:
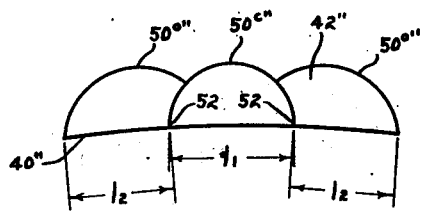
Fig. 17 is a diagrammatic transverse sectional view similar to Fig. 14, illustrating how this feature of equal maximum stress is achieved for a three compartment steam chamber.
Figure 18:
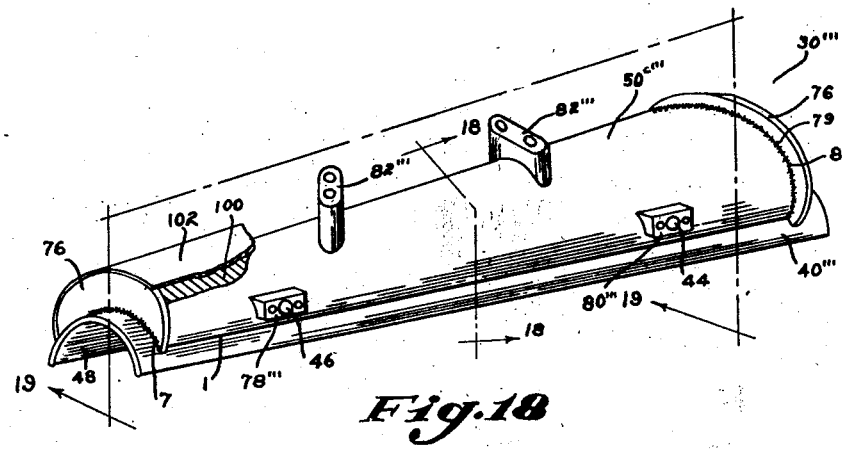
Fig. 18 is a perspective view of a modified form of a pressing head constructed in accordance with my invention having a single compartment pressing chamber constructed of a single generally partially cylindrical member suitable for a sleeve press with the outer covering and outer shell removed.
Figure 19:
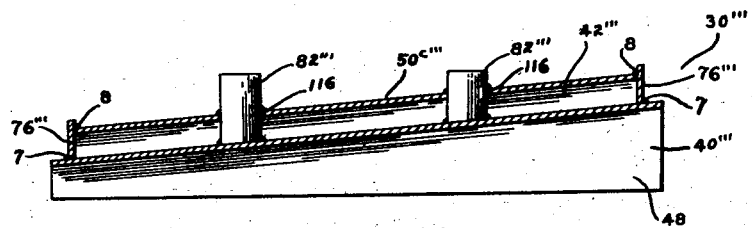
Fig. 19 is a longitudinal sectional view taken along the line 19—19 of Fig. 18.
Figure 20:
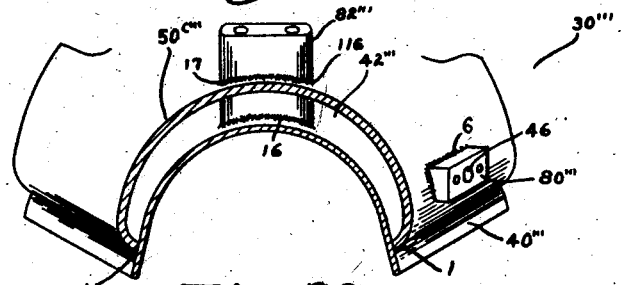
Fig. 20 is an end elevation of a portion of one end of the sleeve press shown in Figs. 18 and 19.

In the drawings, wherein like characters of reference generally indicate like parts throughout, 30 generally indicates a pressing head constructed in accordance with my invention, whether it comprise the oblong pressing head 30 shown in Figs. 1–7, the tapered pressing head 30' shown in Figs. 8–13, the specially constructed pressing head 30'' having all portions of the pressing plate subjected to a substantially equal maximum stress, as shown in Figs. 14–17, whether it comprises the single compartment sleeve press 30''' shown in Figs. 18–20, or whether it comprises other embodiments constructed in accordance with the broad principles of my invention, such as the collar and cuff pressing head shown in my co-pending application for patent for Fabricated multi-purpose pressing head, S. N. 432,022, filed February 23, 1942.

As shown in Fig. 1, the pressing head 30 is suitably mounted on the end of the pressing lever 32 to pivot downwardly into pressing position over the pressing buck 34, the pressing head 30 being suitably moved to a pressing position, pressing the garments against the buck 34 by any suitable means, manually or power actuated (not shown). I have shown in Fig. 1 the aforementioned parts mounted on the usual frame 36 of a standard type of laundry press 38.

In its broader aspects, my invention includes a pressing plate 40 and a steam or other heating fluid chamber 42 comprising a plurality of longitudinally extending members of substantially the length of said pressing plate, having lower edges thereof abutting and externally welded to said pressing plate 40 by externally welded fillets and other edges abutting and externally welded to each other by externally welded fillets to provide longitudinally extending chamber means, preferably a plurality of separate longitudinally extending chamber compartments, all said respective externally welded fillets substantially fusing the abutting surfaces together and providing supplemental external reinforcing fillets for said chamber. Each of the members are welded from the outside as they are successively assembled together. I, therefore, employ the word external as referring to the individual moment of assembly of each respective individual unit, in other words to signify that the fillets are externally applied to each respective unit as it is successively assembled. Said pressing head may be provided with an inlet passage 44 and an outlet passage 46, each connected to each individual chamber, and also preferably with an insulating inner covering 100 and an integral outer shell 102 for said chamber 42 secured to said pressing plate 40.

As stated hitherto, a pressing head 30 constructed in accordance with my invention is constructed of a plurality of separate members including the pressing plate 40 and other members, each of the members being so constructed that the device may be readily assembled by external fillet welding, which, for the reasons given hitherto, namely that it fuses the abutting surfaces together and provides external reinforcing fillets, permits the use of separate members of relatively light weight to make up the pressing head assembly. The members making up the pressing head are also so selected and constructed that they may be successively assembled on a foundation member. In all embodiments of my invention shown herein, said foundation member comprises the pressing plate 40. The pressing plate 40 is constructed of thinner material than hitherto possible in cast pressing heads and which may have its pressing surface 48 suitably finished by electro-plating or otherwise to provide a smooth uniform preferably non-corrosive pressing surface.

While the features of the broader aspects of my invention hitherto described apply to other embodiments, such as the embodiments shown in my co-pending application aforesaid, my invention specifically relates to the construction of the embodiments of my invention shown in this application which permit the ready successive assembly of the various parts thereof on a foundation member, such as the pressing plate and the use of externally welded fillets, substantially fusing the abutting surfaces together and providing supplemental external reinforcing elements for the heating fluid chamber 42.

In the embodiments of my invention shown in this application, the heating fluid chamber 42 is formed by superimposing on the pressing plate 40 one or more longitudinally extending members 50 of substantially the length of said pressing plate of generally partially cylindrical formation to provide, when attached, an arch construction, one of the strongest inherent structures known. Where it be desired to employ a single compartment heating fluid chamber 42''', as in the embodiment of pressing head 30''' shown in Figs. 18–20, I employ a single generally partially cylindrical member 50''' for this purpose. In the other embodiments of my invention shown, it is desirable to provide a multi-compartment heating fluid chamber 42, 42' or 42''. For this purpose in the other embodiments shown, I employ a plurality of longitudinally extending partially cylindrical members 50, 50' or 50'' of substantially the length of said pressing plate, including a central partially cylindrical member 50c, 50c' or 50c'' overlying the center portion thereof and having each edge 52 abutting the center portion of said pressing plate 40, 40' or 40'' and externally welded to said pressing plate by the external fillets 1. For this purpose, as stated, I preferably externally fillet weld all of the external surfaces where each of the abutting edges 52 strikes the pressing plate 40. Inasmuch as the edges of these cylindrical members are relatively thin, they only abut the pressing plate through a relatively short width and do not substantially interfere with the heat distribution through the plate transversely across the pressing plate. I also employ pairs 54 of intermediate partially cylindrical members 50¹, 50¹' or 50¹'' and pairs 56 of outer partially cylindrical members 50°, 50°' and 50°'', each partially cylindrical member thereof having an inner edge 58¹, 58¹' or 58¹'', or 58°, 58°' or 58°'' abutting and externally welded to a portion of the side wall 60c, 60c' or 60c'', or 60¹, 60¹' or 60¹'' of its respectively adjacent inner member 50c, 50c' or 50c'', or 50¹, 50¹' or 50¹'' by the respective external fillets 3 and 5, and an outer edge 62¹, 62¹' or 62¹'', or 62°, 62°' and 62°'' abutting and externally welded to said pressing plate by the external fillets 2 and 4 respectively. Thus in the embodiment of my invention shown in Figs. 1–7, the center partially cylindrical member 50c is first placed in position over the center of the pressing plate to have the edges 52 thereof abut said pressing plate and suitably externally welded thereto by the external fillets 1 in the manner hitherto described. Each intermediate partially cylindrical member 50¹ is then placed in position to have its inner edge 58¹ located in the proper position on the side wall 60c of the center partially cylindrical member 50c and its outer edge 62¹ abutting the pressing plate and its respective outer edge 62¹ is welded to said pressing plate by the external fillet 2 and its inner edge externally welded to the side wall 60c of the center partially cylindrical member 50c by the external fillet 3. Each outer partially cylindrical member 50° is then placed in position to have its inner edge 58° located in the proper position on the side wall 60¹ of its respectively adjacent inner member, in this instance the intermediate partially cylindrical member 50¹ and its outer edge 62° abutting the pressing plate 40 and its respective outer edge 62° is welded to said pressing plate by the external fillet 4, and its inner edge 58° is externally welded to the side wall 60¹ of the next adjacent inner member, in this instance the intermediate member 50¹, by the external fillet 5. It is thus obvious that with this construction a heating fluid chamber 42 is provided, comprising a center compartment 64c, the intermediate compartments 64¹ and the outer compartments 64°. If desired, however, the order of rotation of welding the fillets may be 1, 3, 2, 5 and 4. The intermediate partially cylindrical members 50¹ comprising the intermediate compartments 64¹ and including the center partially cylindrical member 50c forming the center compartment 64c are provided with the aligned interconnecting passage holes 66¹ and 66c at each respective end thereof and also with aligned holes at spaced intervals longitudinally thereof. In the embodiment shown, the intermediate transverse holes comprise the aligned inlet holes 68¹ and 68c and the aligned outlet holes 70¹ and 70c. The rear outer partially cylindrical member 50°r also has the respective similarly longitudinally spaced respective inlet pipe hole 72 and the outlet pipe hole 74 respectively aligned with the aligned inlet holes 68¹ and 68c and aligned outlet holes 70¹ and 70c hitherto described. The inlet pipe 44 extends through said inlet pipe hole 72 to the foremost outer partially cylindrical member 50°r through the set of aligned inlet holes 68¹ and 68c and has the discharge holes 45 on the upper surface thereof within each respective compartment 64. As stated, the outlet pipe hole 74 is aligned with said outlet holes 70¹ and 70c.

To provide a heating fluid chamber 42, whether it comprises a single chamber or a chamber having compartments 64, it is necessary to have its ends thereof suitably closed. For this purpose, in all embodiments shown I provide the vertical end plates 76 having inner walls abutting and externally welded to the ends 79 of the partially cylindrical members 50, in the embodiments shown by the external fillets 8 and the lower edges thereof abutting and externally welded to said pressing plate by the external fillets 7. It is thus obvious that with this construction I have provided a completely closed in heating fluid chamber 42 having the compartments 64 therein, as in the embodiments shown in Figs. 1–17.

For a purpose to be described, I provide an inlet boss 78 and an outlet boss 80, which in the embodiment shown are rectangular, projecting forwardly from said respective inlet hole 72 and outlet hole 74 in the rear partially cylindrical member 50$^{or}$, and preferably, in the embodiment shown, externally welded thereto by the external fillets 6. I also provide pressing lever attaching bosses, preferably central ones 82 over the central partially cylindrical member 50$^{c}$ and outer attaching bosses 84 over the intermediate partially cylindrical members 50$^{i}$. The center attaching boss abuts said center partially cylindrical member 50$^{c}$ and is welded thereto by the fillet 9. The outer attaching bosses 84 abut the respective intermediate partially cylindrical members 50$^{i}$ and have their lower ends welded thereto by the fillets 10.

I also provide tie plates 86 each having a downwardly projecting front end 88$^{f}$ overlying and externally welded to said pressing plate 40 by the external fillets 14. The outer edges of the inlet boss 78 and outlet boss 80 abut and are externally welded to the rear tie plate end 88$^{r}$ by the external fillets 13. Said outlet boss 80 is preferably aligned with the aligned set of outlet holes 70$^{c}$ and 70$^{i}$ in the partially cylindrical members 50$^{c}$ and 50$^{i}$. The tie plates 86 are provided with the cooperating attaching boss holes 90 for the center attaching boss 82 overlying the center member 50$^{c}$ and the outer attaching boss holes 92 for the outer attaching bosses 84 overlying the intermediate members 50$^{i}$. The respective pressing lever attaching bosses 82 and 84 are externally welded to their respective tie plate holes 90 and 92 by the respective fillets 11 and fillets 12. The ends 94 of the center portion 96 of the tie plates 86 overlying the center portions of the outer partially cylindrical members 50$^{o}$ are provided with the holes 98. The ends 94 of the tie plate may be suitably welded to said overlying outer partially cylindrical members 50$^{o}$ by the external fillets 15 contained within said holes 98. It is thus obvious that the center portions 96 of the tie rods 86 form struts of substantially the contour of the pressing plates welded to the apex of each respective partially cylindrical member, to the center member 50$^{c}$ by the center attaching boss 82, to the intermediate members 50$^{i}$ by the outer attaching bosses 84 and to the outer members 50$^{o}$ by the external welded fillets 15. It is thus obvious that the external fillets 9 and 10 binding the lower ends of the bosses to the respective partially cylindrical members 50$^{c}$ and 50$^{i}$ and the external fillets 11 and 12 binding the outer ends of the partially cylindrical bosses to the tie plates provide supplemental means for rigidly securing said struts to said partially cylindrical members and that said partially cylindrical members are supplementally secured to said pressing plate 40 by the respective ends of said tie plates, namely by the external fillets 14 binding the front ends 88$^{f}$ of the tie plates 86 to the pressing plate 40 and by the fillets 13 binding the rear ends 88$^{r}$ of the tie plates 86 to the inlet and outlet bosses 78 and 80, which in turn are externally welded to the pressing plate by the fillets 6, which may be continuations of the fillets 4. It is thus apparent that, as stated, all said respective externally welded fillets 1–15 substantially fuse the abutting surfaces together, which in each instance comprises the relatively thin edge of one member abutting the surface of another member and provide supplemental external reinforcing elements for said heating fluid chamber 42.

I also may employ a supplemental insulating inner covering 100 constructed of asbestos or any other suitable insulating material, and an outer shell 102 constructed of metal or any other suitable material to cover the entire heating chamber 42 between the end plates 76 of substantially the transverse contour and secured to the tie plates 86 in any suitable manner, such as by the screws 104, with the side walls thereof fitting within the channels 105 formed interior of the side flanges 107.

I have shown in Figs. 8–13 an embodiment of tapered pressing head 30′ which may be used for certain types of laundry work. In this instance the pressing plate 40′ tapers as at 106 towards one end thereof. In order that the heating fluid chamber 42′ may correspondingly taper, each respective intermediate partially cylindrical member 50$^{i\prime}$ and outer partially cylindrical members 50$^{o\prime}$ has its respective inner edge 58$^{i\prime}$ or 58$^{o\prime}$ overlying the wall 60$^{c\prime}$ or 60$^{i\prime}$ of its respectively adjacent inner member 50$^{c\prime}$ or 50$^{i\prime}$ progressively increasing similar amounts from the wider end 108 thereof to the narrower end 110 thereof, progressively increasing in similar amounts to cause said overlying steam chamber to taper similarly to said pressing plate, with said respective compartments 64$^{i\prime}$ and 64$^{o\prime}$ progressively narrowing, from the section shown in Fig. 12 to the section shown in Fig. 13, to cause said steam chamber 42′ made up of said composite compartments to taper similarly to said pressing plate. In all other respects the embodiment shown in Figs. 8–13 is exactly similar to the embodiment of my invention shown in Figs. 1–7.

Figure 8:
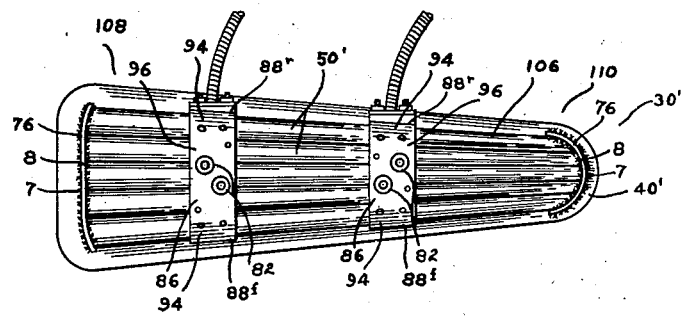
Fig. 8 is a plan view of a modified form of my invention comprising a tapered pressing head for use in pressing wearing apparel and other types of laundry work, constructed in accordance with my invention, with the insulating covering and outer shell removed.
Figure 9:
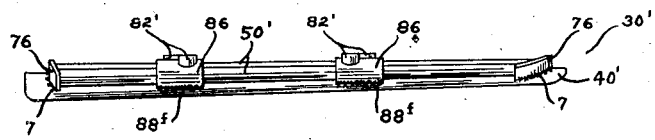
Fig. 9 is a side edge elevation illustrating the parts of the pressing head shown in Fig. 8.
Figure 10:
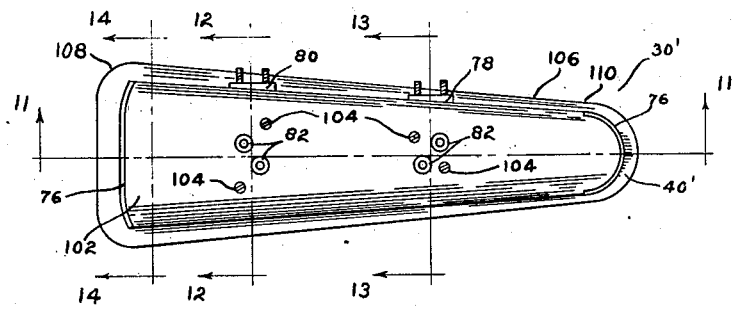
Fig. 10 is a plan view of the tapered embodiment of pressing head shown in Figs. 8 and 9 with the insulating covering and outer shell attached.
Figure 11:
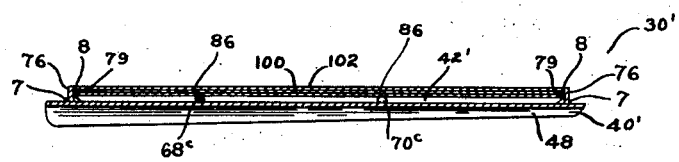
Fig. 11 is a longitudinal sectional view taken along the line 11—11 of Fig. 10.
Figure 12:
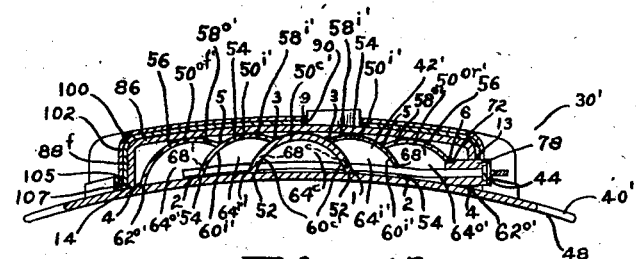
Fig. 12 is a transverse sectional view taken along the line 12—12 of Fig. 10.
Figure 13:
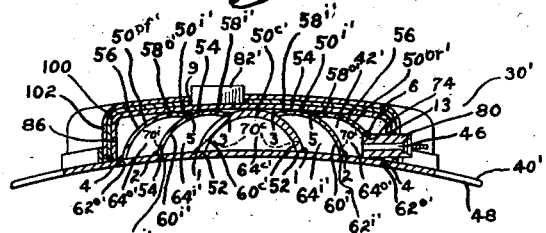
Fig. 13 is a transverse sectional view taken along the line 13—13 of Fig. 10.
Figure 14:
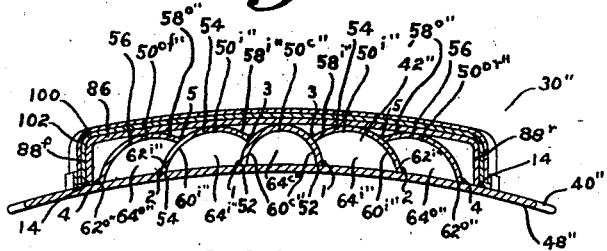
Fig. 14 is a transverse sectional view taken along the line 14—14 of Fig. 10, or along any of the section lines 14—14 shown in Fig. 4 with the partially cylindrical members thereof constructed and superimposed upon each other to provide a pressure chamber, with all portions of the pressing plate subjected to a substantially equal maximum stress for each compartment.
Figure 15:
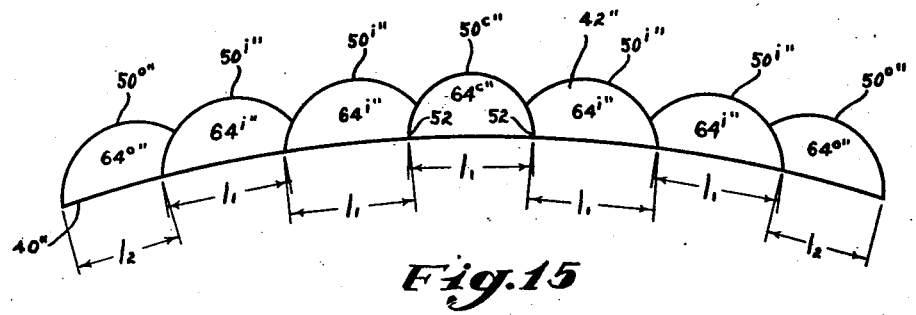
Fig. 15 is a diagrammatic transverse sectional view similar to Fig. 14, illustrating how this feature of equal maximum stress is achieved for a seven compartment steam chamber.

I have shown in Fig. 14 a cross-sectional view of the embodiment of my invention shown in Figs. 8–13, taken along the line 14—14 of Fig. 10, or along any transverse sectional line 14—14 of the embodiment of my invention shown in Fig. 4, modified so as to provide a pressure chamber 42″, having compartments with all portions of the pressing plate 40″ subjected to substantially equal maximum stress for each respective compartment. In order to achieve this result, however, it is necessary that the width of each intermediate compartment 64$^{i\prime\prime}$ including the center compartment 64$^{c\prime\prime}$, taken along the upper surface of the pressing plate be approximately 1.223 times the width of each pressure compartment 64$^{o\prime\prime}$ taken along the upper surface of said pressing plate 42″. In the embodiment shown, I have achieved this result by having the respective intermediate and outer partially cylindrical members 50$^{i\prime\prime}$ and 50$^{o\prime\prime}$ of greater radius than the center partially cylindrical member 50$^{c\prime\prime}$. The ratio of relative width of 1.223 to 1 between the intermediate compartments, including the center compartment and the outer compartments taken along the upper surface of the pressing plate may be proved as follows:

Assuming as shown in Figs. 15–17 that $s$ represents the maximum allowable stress permissible for the material used for the pressing plate for the respective outer compartments and the intermediate compartments, $W_1$ and $W_2$ represent the evenly distributed load on the pressing plate for each respective compartment of one unit length; $L_1$ and $L_2$ represent the respective transverse widths of the compartments taken along the upper surface of the pressing plate; Z equals the section modulus of the cross section of the pressing plate per unit length; P equals the internal pressure in the heating fluid chamber, in this instance the same in each interconnected compartment. It is apparent that as shown in Case 13 on page 380 of "Machinery's Handbook for Machine Shop and Drafting Room" by Eric Oberg and F. D. Jones, 11th edition, New York, The Industrial Press, 1941, which is typical of standard engineering knowledge, the stress of each outer compartment may be expressed as follows:

$$S_{max} = \frac{W_2 L_2}{8Z}$$

The stress on each intermediate compartment, as illustrated in Case 18 on page 382 of said Handbook, may be expressed as follows:

$$S_{max} = \frac{W_1 L_1}{12Z}$$

As pressure P is equal in all compartments, then $W_1 = L_1 P_1$ for unit width
$W_2 = L_2 P_2$ for unit width and $$S_{max} = \frac{W_2 L_2}{8Z} = \frac{W_1 L_1}{12Z}$$

or $$\frac{P L_2^2}{8Z} = \frac{P L_1^2}{12Z}$$

$$\frac{L_2^2}{8} = \frac{L_1^2}{12}$$

$$\frac{L_1^2}{L_2^2} = \frac{12}{8} = \frac{3}{2}$$

$$\frac{L_1}{L_2} = \sqrt{\frac{3}{2}} = 1.223$$

$$L_1 = L_2 \times 1.223$$

As illustrated in Figs. 15–17 any suitable number of intermediate compartments may be employed, such as seven shown in Fig. 15, five shown in Figs. 1–14 and Fig. 16, and three shown in Fig. 17.

As stated hitherto, the heating fluid chamber 42''' may comprise a single compartment, and I have shown in Figs. 18–20 a single compartment pressing head constructed in accordance with my invention, having a pressing plate 40''' of relatively small radius increasing from end to end so that it may similarly taper, which may be readily employed as a sleeve press for garments being laundered. In this instance the inlet and outlet pipes 44 and 46 and all pressing lever attaching bosses 82''' are directly welded to the single partially cylindrical member 50c''' forming the single compartment 64''', which in turn is welded to the pressing plate as usual by the fillets 1, the end plates 76''' being welded to the pressing plate and to the ends of the partially cylindrical member 50c''' by the fillets 7 and 8 hitherto described, and the respective inlet and outlet bosses 78''' and 80''' and pressing lever attaching bosses 82''' being welded to the partially cylindrical member 50c'''. If desired, the partially cylindrical member 50c''' may be provided with suitable holes 116 for the pressing lever attaching bosses 82''', the lower ends of which may project downwardly to abut the pressing plate 40''', and if this is done, said lower ends may be welded to the pressing plate by the external fillets 16, and inasmuch as said attaching bosses are also welded to the cylindrical member 50c''' by the fillets 17, it is obvious that said pressing lever attaching bosses 82''' will supplementally function as struts to positively bind the partially cylindrical member 50c''' externally to the center portion of the pressing plate 40''', thereby tending to prevent warping in the arcuately curved pressing plate.

In any embodiment shown the pressing plate may be flat or arcuately curved, as illustrated, even to the shape, having a small radius, as shown in Figs. 18–20.

While any suitable type of welding may be employed with sufficient heat to cause the abutting surfaces to at least partially fuse together and to provide the external reinforcing fillets 1–17 hitherto described, I preferably employ arc welding for this purpose. I have shown in Fig. 21 an enlarged view illustrating in detail how this fillet welding functions to partially melt portions of the abutting surfaces to cause them to fuse together, as at 112, and also provides the external reinforcing fillet lines 114 to function as supplemental bolstering elements to prevent expansion and explosion of the heating steam chamber.

It is apparent that I have provided a novel type of pressing head with the advantages explained above.

It is understood that my invention is not limited to the specific embodiments shown and that various deviations may be made therefrom without departing from the spirit and scope of the appended claims.

What I claim is:

1. A pressing head comprising a generally oblong pressing plate movable into pressing relationship with a stationary buck and a heating fluid chamber superimposed thereon, comprising a plurality of longitudinally extending rigid reinforcing members of substantially the length of said pressing plate, having lower edges thereof abutting and externally welded to said pressing plate assembled together and other edges abutting and externally welded to other member portions to provide longitudinally extending separate chamber compartments, intermediate ones of said members having aligned passage holes interconnecting said chamber compartments at spaced intervals transversely thereof, the rear member also having longitudinally spaced inlet and outlet line holes in the rear edge thereof, an inlet line extending through said inlet line hole to the foremost chamber unit through one set of transverse holes, the rear edge of said rear member also having an outlet line connected to said outlet line hole in line with another set of aligned transverse holes, all said respective externally welded fillets substantially fusing the abutting surfaces together and providing supplemental external reinforcing fillets for said chamber and means closing the ends of said compartments.

2. A pressing head comprising a generally oblong pressing plate movable into pressing relationship with a stationary buck and a heating fluid chamber superimposed thereon, comprising a plurality of longitudinally extending rigid reinforcing members of substantially the length of said pressing plate having lower edges thereof abutting and externally welded to said pressing plate assembled together and other edges abutting and externally welded to other member portions to provide longitudinally extending separate chamber compartments, all said respective externally welded fillets substantially fusing the abutting surfaces together and providing supplemental external reinforcing fillets for said chamber and means closing the ends of said compartments.

3. A pressing head comprising a generally oblong pressing plate movable into pressing relationship with a stationary buck and a steam chamber superimposed thereon, comprising a plurality of longitudinally extending rigid reinforcing members of substantially the length of said pressing plate having lower edges thereof abutting and externally welded to said pressing plate assembled together and other edges abutting and externally welded to other member portions, all said respective externally welded fillets substantially fusing the abutting surfaces together and providing supplemental external reinforcing fillets for said chamber and means closing the ends of the chamber.

4. A pressing head comprising an oblong pressing plate movable into pressing relationship with a stationary buck and a heating fluid chamber superimposed thereon, comprising longitudinally extending rigid reinforcing means substantially circular in section throughout at least the major portion thereof of substantially the length of said pressing plate having each edge thereof abutting and externally welded to said pressing plate, vertical end plates for closing the ends of said means having inner walls abutting and externally welded to the ends thereof and the lower edges thereof abutting and externally welded to said pressing plate, all said respective externally welded fillets substantially fusing the abutting edges together and providing supplemental external reinforcing fillets for said chamber.

5. A pressing head comprising a generally oblong pressing plate movable into pressing relationship with a stationary buck and a heating fluid chamber superimposed thereon, comprising longitudinally extending rigid reinforcing means substantially circular in section throughout at least the major portion thereof of substantially the length of said pressing plate having each edge thereof abutting and externally welded to said pressing plate, vertical end plates for closing the ends of said means having inner walls abutting and externally welded to the ends thereof and the lower edges thereof abutting and externally welded to said pressing plate, all said respective externally welded fillets substantially fusing the abutting edges together and providing supplemental external reinforcing fillets for said chamber, a fluid inlet passage connected to said means and a fluid outlet passage connected to said means.

6. A pressing head comprising a generally oblong pressing plate movable into pressing relationship with a stationary buck and a heating fluid chamber superimposed thereon, comprising longitudinally extending rigid reinforcing means substantially circular in section throughout at least the major portion thereof of substantially the length of said pressing plate having each edge thereof abutting and externally welded to said pressing plate, said respective externally welded fillets substantially fusing the abutting edges together and providing supplemental external reinforcing fillets for said chamber and means closing the ends of said means.

7. A pressing head comprising a generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of partially cylindrical members each having an inner edge abutting and externally welded to a portion of the side wall of its respectively adjacent inner member and an outer edge abutting and externally welded to said pressing plate, intermediate partially cylindrical members having aligned interconnecting passage holes at each end and at spaced intervals longitudinally thereof, the rear partially cylindrical member also having longitudinally spaced inlet and outlet line holes in the rear edge thereof, an inlet line extending through said inlet line hole to the foremost partially cylindrical member through one set of transverse holes, vertical end plates for closing the ends of said partially cylindrical members having inner walls abutting and externally welded to the ends thereof and the lower edges thereof abutting and externally welded to said pressing plate, tie plates transversely overlying said partially cylindrical members having the front ends thereof overlying and externally welded to said pressing plate having attaching bosses receiving holes therein, inlet and outlet bosses for said inlet and outlet lines projecting forwardly from and externally welded to said line holes in the rear partially cylindrical member and abutting and externally welded to the rear tie plate end, said outlet boss being aligned with another set of transverse holes, and pressing lever attaching bosses projecting through and externally welded to their respective tie plate holes having their lower ends abutting and externally welded to the portions of said partially cylindrical members underneath said holes to positively bind said tie plates to said chamber, all said respective externally welded fillets substantially fusing the abutting surfaces together and providing supplemental external reinforcing fillets for said chamber.

8. A pressing head comprising a generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of partially cylindrical members each having an inner edge abutting and externally welded to a portion of the side wall of its respectively adjacent inner member and an outer edge abutting and externally welded to said pressing plate, and vertical end plates for closing the ends of said partially cylindrical members having inner walls abutting and externally welded to the ends thereof and the lower edges thereof abutting and externally welded to said pressing plate, all said respective externally welded fillets substantially fusing the abutting surfaces together and providing supplemental external reinforcing fillets for said chamber.

9. A pressing head comprising a generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of partially cylindrical members each having an inner edge abutting and externally welded to a portion of the side wall of its respectively adjacent inner member and an outer edge abutting and externally welded to said pressing plate, vertical end plates for closing the ends of said partially cylindrical members having inner walls abutting and externally welded to the ends thereof and the lower edges thereof abutting and externally welded to said pressing plate, tie plates transversely overlying said partially cylindrical members having the ends thereof overlying and externally welded to said pressing plate having attaching boss receiving holes therein, pressing lever attaching bosses projecting through and externally welded to their respective tie plate holes having their lower ends abutting and externally welded to the portions of said partially cylindrical members underneath said holes to positively bind said tie plates to said chamber, all said respective externally welded fillets substantially fusing the abutting surfaces together and providing supplemental external reinforcing fillets for said chamber.

10. A pressing head comprising a generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of partially cylindrical members each having an inner edge abutting and externally welded to a portion of the side wall of its respectively adjacent inner member and an outer edge abutting and externally welded to said pressing plate, said partially cylindrical members having aligned interconnecting passage holes at each end and at spaced intervals transversely thereof, the rear partially cylindrical member also having longitudinally spaced inlet and outlet pipe holes in the rear edge thereof, an inlet pipe extending through said inlet pipe hole to the foremost partially cylindrical member through one set of transverse holes, the rear edge of said rear partially cylindrical member also having an outlet pipe connected thereto in line with another set of aligned transverse holes, vertical end plates for closing the ends of said partially cylindrical members having inner walls abutting and externally welded to the ends thereof and the lower edges thereof abutting and externally welded to said pressing plate, tie plates transversely overlying said partially cylindrical members having the ends thereof overlying and externally welded to said pressing plate, all said respective externally welded fillets substantially fusing the abutting surfaces together and providing supplemental external reinforcing fillets for said chamber.

11. A pressing head comprising an oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of partially cylindrical members each having an inner edge abutting and externally welded to a portion of the side wall of its respectively adjacent inner member and an outer edge abutting and externally welded to said pressing plate, vertical end plates for closing the ends of said partially cylindrical members having inner walls abutting and externally welded to the ends thereof and the lower edges thereof abutting and externally welded to said pressing plate, all said respective externally welded fillets substantially fusing the abutting surfaces together and providing supplemental external reinforcing fillets for said chamber, a fluid inlet passage connected to each partially cylindrical member and a fluid outlet passage connected to each partially cylindrical member.

12. A pressing head comprising a tapered generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of outer partially cylindrical members each having an inner edge abutting and externally welded to a portion of the side wall of its respectively adjacent inner member and an outer edge abutting and externally welded to said pressing plate, all said respective externally welded fillets substantially fusing the abutting surfaces together and providing supplemental external reinforcing fillets for said chamber, each respective outer partially cylindrical member of each pair having its respective inner edge overlying the wall of its respectively adjacent inner member progressively increasing similar amounts to cause said overlying heating fluid chamber to taper similarly to said pressing plate.

13. A pressing head comprising a tapered generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof and having each edge thereof abutting and externally welded to said pressing plate and pairs of outer partially cylindrical members each having an inner edge abutting and externally welded to a portion of the side wall of its respectively adjacent inner member and an outer edge abutting and externally welded to said pressing plate, vertical end plates for closing the ends of said partially cylindrical members having inner walls abutting and externally welded to the ends thereof and the lower edges thereof abutting and externally welded to said pressing plate, all said respective externally welded fillets substantially fusing the abutting surfaces together and providing supplemental external reinforcing fillets for said chamber, each respective outer partially cylindrical member of each pair having its respective inner edge overlying the wall of its respectively adjacent inner member progressively increasing similar amounts to cause said overlying heating fluid chamber to taper similarly to said pressing plate.

14. A pressing head comprising a generally oblong pressing plate movable into pressing relationship with a stationary buck and a heating fluid chamber superimposed thereon, comprising a plurality of longitudinally extending partially cylindrical rigid reinforcing members of substantially the length of said pressing plate including a central partially cylindrical member overlying the center portion thereof forming a central heating fluid chamber compartment and having each edge thereof abutting and externally welded to said pressing plate and pairs of partially cylindrical members of greater radius than said central partially cylindrical member, each having an inner edge abutting and externally welded to a portion of the side wall of its respectively adjacent inner member and an outer edge abutting and externally welded to said pressing plate to provide outer pressure chamber compartments and intermediate pressure chamber compartments, said members being superimposed on each other so that the width of each intermediate compartment including said center compartment taken along the upper surface of the pressing plate is approximately 1.223 times the width of each outer pressure chamber compartment taken along the upper surface of said pressing plate so as to provide a pressure chamber with all portions of the pressing plate subjected to a substantially equal maximum stress for each compartment, intermediate partially cylindrical members having aligned interconnecting passage holes at each end and at spaced intervals longitudinally thereof, the rear partially cylindrical member also having longitudinally spaced inlet and outlet line holes in the rear edge thereof, an inlet line extending through said inlet line hole to the foremost partially cylindrical member through one set of transverse holes, vertical end plates for closing the ends of said partially cylindrical members having inner walls abutting and externally welded to the ends thereof and the lower edges thereof abutting and externally welded to said pressing plate, tie plates transversely overlying said partially cylindrical members having the front ends thereof overlying and externally welded to said pressing plate having attaching boss receiving holes therein, inlet and outlet bosses for said inlet and outlet lines projecting forwardly from and externally welded to said line holes in the rear partially cylindrical member and abutting and externally welded to the rear tie plate end, said outlet boss being aligned with another set of transverse holes, pressing lever attaching bosses projecting through and externally welded to their respective tie plate holes having their lower ends abutting and externally welded to the portions of said partially cylindrical members underneath said holes to positively bind said tie plates to said chamber, all said respective externally welded fillets substantially fusing the abutting surfaces together and providing supplemental external reinforcing fillets for said chamber, and an insulating inner covering and an outer shell substantially the transverse contour of and secured to said tie plates between said end plates having holes therein for said line and attaching bosses.

15. A pressing head comprising a generally oblong pressing plate movable into pressing relationship with a stationary buck and a heating fluid chamber superimposed thereon comprising a plurality of longitudinally extending partially cylindrical rigid reinforcing members of substantially the length of said pressing plate, including a central partially cylindrical member overlying a center portion thereof forming a central heating fluid chamber compartment and having each edge thereof abutting and externally welded to said pressing plate and pairs of partially cylindrical members of greater radius than said central partially cylindrical member, each having an inner edge abutting and externally welded to a portion of the side wall of its respectively adjacent inner member, and an outer edge abutting and externally welded to said pressing plate to provide outer pressure chamber compartments and intermediate pressure chamber compartments, said members being superimposed on each other so that the width of each intermediate compartment including said center compartment taken along the upper surface of the pressing plate is approximately 1.223 times the width of each outer pressure chamber compartment taken along the upper surface of said pressing plate so as to provide a pressure chamber with all portions of the pressing plate subjected to a substantially equal maximum stress for each compartment, all said respective externally welded fillets substantially fusing the abutting surfaces together and providing supplemental external reinforcing fillets for said chamber.

16. A pressing head comprising a generally oblong pressing plate movable into pressing relationship with a stationary buck and a heating fluid chamber superimposed thereon comprising a plurality of longitudinally extending partially cylindrical rigid reinforcing members of substantially the length of said pressing plate, including a central partially cylindrical member overlying a center portion thereof forming a central heating fluid chamber compartment and having each edge thereof abutting and externally welded to said pressing plate and pairs of partially cylindrical members, each having an inner edge abutting and externally welded to a portion of the side wall of its respectively adjacent inner member, and an outer edge abutting and externally welded to said pressing plate to provide outer pressure chamber compartments and intermediate pressure chamber compartments and means closing the ends of said compartments, said members being superimposed on each other so as to provide a pressure chamber with all portions of the pressing plate subjected to a substantially equal maximum stress for each compartment, all said respective externally welded fillets substantially fusing the abutting surfaces together and providing supplemental external reinforcing fillets for said chamber.

17. A pressing head comprising a generally oblong pressing plate movable into pressing relationship with a stationary buck and a heating fluid chamber superimposed thereon comprising a plurality of longitudinally extending partially cylindrical rigid reinforcing members of substantially the length of said pressing plate, including a central partially cylindrical member overlying a center portion thereof forming a central heating fluid chamber compartment and having each edge thereof abutting and externally welded to said pressing plate and pairs of partially cylindrical members of greater radius than said central partially cylindrical member, each having an inner edge abutting and externally welded to a portion of the side wall of its respectively adjacent inner member, and an outer edge abutting and externally welded to said pressing plate to provide outer pressure chamber compartments and intermediate pressure chamber compartments and means closing the ends of said compartments, said members being superimposed on each other so as to provide a pressure chamber with all portions of the pressing plate subjected to a substantially equal maximum stress for each compartment, all said respective externally welded fillets substantially fusing the abutting surfaces together and providing supplemental external reinforcing fillets for said chamber.

18. A pressing head comprising a generally oblong pressing plate movable into pressing relationship with a stationary buck and a heating fluid chamber superimposed thereon comprising a plurality of longitudinally extending partially cylindrical rigid reinforcing members of substantially the length of said pressing plate, including a central partially cylindrical member overlying a center portion thereof forming a central heating fluid chamber compartment and having each edge thereof abutting and externally welded to said pressing plate and pairs of partially cylindrical members, each having an inner edge abutting and externally welded to a portion of the side wall of its respectively adjacent inner member, and an outer edge abutting and externally welded to said pressing plate to provide outer pressure chamber compartments and intermediate pressure chamber compartments, said members being superimposed on each other so that the width of each intermediate compartment including said center compartment taken along the upper surface of the pressing plate is approximately 1.223 times the width of each outer pressure chamber compartment taken along the upper surface of said pressing plate so as to provide a pressure chamber with all portions of the pressing plate subjected to a substantially equal maximum stress for each compartment, all said respective externally welded fillets substantially fusing the abutting surfaces together and providing supplemental external reinforcing fillets for said chamber and means closing the ends of said compartments.

19. A pressing head comprising a generally oblong pressing plate movable into pressing relationship with a stationary buck and a heating fluid chamber superimposed thereon, comprising a single longitudinally extending rigid reinforcing member substantially circular in section throughout at least the major portion thereof of substantially the length of said pressing plate having each edge thereof abutting and externally welded to said pressing plate, and vertical end plates for closing the ends of said member having inner walls abutting and externally welded to the ends thereof and the lower edges thereof abutting and externally welded to said pressing plate, all said respective externally welded fillets substantially fusing the abutting edges together and providing supplemental external reinforcing fillets for said chamber.

20. A pressing head comprising a generally oblong pressing plate movable into pressing relationship with a stationary buck and a heating fluid chamber superimposed thereon, comprising a single longitudinally extending rigid reinforcing member substantially circular in section throughout at least the major portion thereof of substantially the length of said pressing plate having each edge thereof abutting and externally welded to said pressing plate, all said respective externally welded fillets substantially fusing the abutting edges together and providing supplemental external reinforcing fillets for said chamber and means to close the ends of said member.

21. A pressing head comprising a generally oblong pressing plate movable into pressing relationship with a stationary buck and a heating fluid chamber superimposed thereon, comprising a single longitudinally extending rigid reinforcing member substantially circular in section throughout at least the major portion thereof of substantially the length of said pressing plate having each edge thereof abutting and externally welded to said pressing plate, vertical end plates for closing the ends of said member having inner walls abutting and externally welded to the ends thereof and the lower edges thereof abutting and externally welded to said pressing plate, all said respective externally welded fillets substantially fusing the abutting edges together and providing supplemental external reinforcing fillets for said chamber, a fluid inlet passage connected to said member and a fluid outlet passage connected to said member.

22. A pressing head comprising a generally oblong pressing plate movable into pressing relationship with a stationary buck and a heating fluid chamber superimposed thereon, comprising a longitudinally extending member substantially circular in section throughout at least the major portion thereof of substantially the length of said pressing plate having attaching boss receiving holes therein and having each edge thereof abutting and externally welded to said pressing plate, vertical end plates for closing the ends of said member having inner walls abutting and externally welded to the ends thereof and the lower edges thereof abutting and externally welded to said pressing plate, pressing lever attaching bosses projecting through and externally welded to their respective member holes having their lower ends abutting and externally welded to the portions of said pressing plate underneath said holes to positively bind said chamber to said pressing plate, all said respective externally welded fillets substantially fusing the abutting edges together and providing supplemental external reinforcing fillets for said chamber.

FRANK C. LORNITZO.